P. KUEHN.
AIR COMPRESSOR.
APPLICATION FILED JULY 13, 1914.

1,283,416.

Patented Oct. 29, 1918.

Witnesses
Chas. W. Stauffiger
Anna M. Dorr

Inventor
Paul Kuehn,
By
Attorneys

UNITED STATES PATENT OFFICE.

PAUL KUEHN, OF DETROIT, MICHIGAN.

AIR-COMPRESSOR.

1,283,416.

Specification of Letters Patent.   Patented Oct. 29, 1918.

Application filed July 13, 1914.  Serial No. 850,534.

*To all whom it may concern:*

Be it known that I, PAUL KUEHN, a citizen of the United States of America, residing at Detroit, in the county of Wayne and State of Michigan, have invented certain new and useful Improvements in Air-Compressors, of which the following is a specification, reference being had therein to the accompanying drawings.

This invention relates to an air compressor particularly adapted for use upon motor vehicles in storing air under pressure to be used for any desired purpose, and its object is to provide a simple and efficient device adapted to be operated by the movement of a spring supported vehicle body or frame, relative to its running gear or axle, and to so construct said device as to obviate the necessity for automatic regulating means to prevent overcharging a tank into which air is compressed thereby.

With these and other ends in view the invention resides in the matter hereinafter more fully set forth and pointed out in the appended claim, reference being had to the accompanying drawings, in which—

Figure 1:
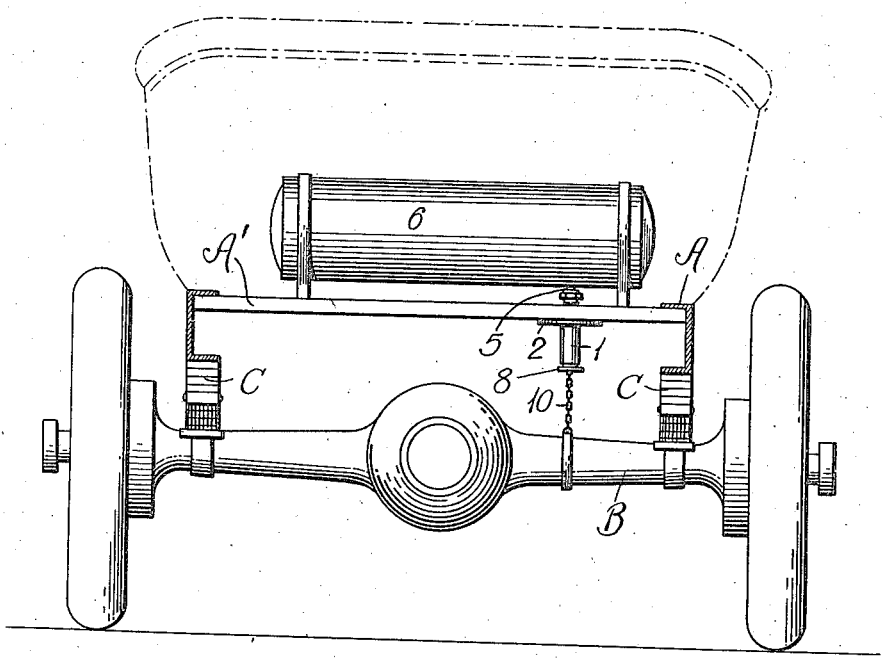
Figure 2:
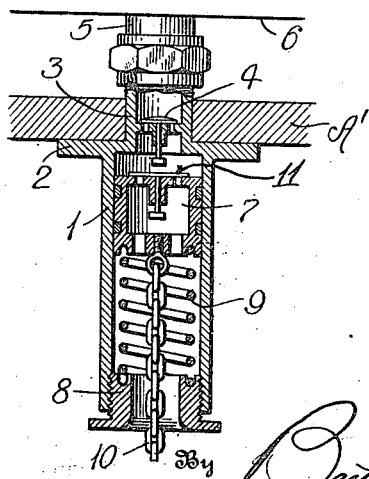

Figure 1 is a diagrammatic view illustrating one manner of attaching the device embodying the invention to a motor vehicle; and Fig. 2 is an enlarged longitudinal section through the device.

For convenience of illustration the device embodying the invention is shown as attached to a cross member A' of a frame A which is supported upon an axle B by springs C with its piston connected to the axle, but it will be understood that it may be connected between any suitable members or parts of any machine, which members are relatively movable toward and from each other.

The air pump or compressor comprises a cylinder 1 which is open at one end and provided at its opposite end with means such as a perforated flange 2, for securing the same to the underside of the cross member A' or other support. The closed end of the cylinder is also preferably formed with a tubular extension or chambered nipple 3 having an internal seat for an outwardly opening check valve 4, and this extension is connected in any suitable manner as by a pipe 5 with a suitable tank 6 adapted to hold air forced in by the pump.

Within the cylinder is a piston 7 having a valve 11 to permit air to pass into the upper end of the cylinder upon the down stroke of the piston and interposed between the lower end of said piston and an adjustable ring 8 screwed into the open end of the cylinder is a coiled compression spring 9 adapted to normally force the piston toward the discharge end of the cylinder. The piston is moved in the cylinder against the action of said spring by a flexible connecting member such as a chain 10 which is secured at one end in any suitable manner to the outer end of the piston and at its opposite end to the axle.

When the frame A and axle D move away from each other, a pull will be exerted upon the chain and the piston will be moved downward in its cylinder against the action of the spring 9. Upon movement toward each other of the frame and axle, the spring will act to force the piston upward and drive the air trapped in the upper end of the cylinder, past the check valve 4 into the tank. The spring thus acts to move the piston on its working stroke and therefore when the air pressure in the tank becomes so great that the force required to force the air past the check valve is greater than the power of the spring, the operation of the pump will stop, thus obviating the necessity for providing suitable automatic means for rendering the pump inoperative when the pressure in the tank reaches a predetermined amount. The pressure in the tank will be determined by the strength of the spring and this may be adjusted by screwing the ring 8 into or out of the cylinder. The chain also forms a flexible connection which provides for independent movement of the body or frame and axle in any direction, and permits free movement of the axle and frame when the piston is held moved downward by air pressure in the cylinder.

A very simple and efficient pump which may be readily attached to any motor vehicle, is provided, and the reciprocation of the spring supported frame and movements of the axle relative thereto, is utilized to actuate the same.

Obviously, changes may be made in the construction and arrangement of parts and in their application in use without departing from the spirit of the invention, and I do not therefore limit myself to the construction or arrangement shown.

Having thus fully described my invention what I claim is:—

In a device of the character described, the combination of a rigidly supported cylinder, having an outlet port in its end and open at its opposite end, a valve controlling the outlet port, a flexible member attached to the piston and extending through the open end of the cylinder, a bushing ring having screw threaded engagement with the open end of the cylinder, and forming an abutment, and a spring interposed between said bushing and the piston within the cylinder, said flexible member extending freely through the said bushing and having free lateral play therein, said piston being unguided except by contact with the wall of the cylinder.

In testimony whereof I affix my signature in presence of two witnesses.

PAUL KUEHN.

Witnesses:
ANNA M. DORR,
LEWIS E. FLANDERS,